J. Kraus,
Stall.
No. 105,814.     Patented July 26, 1870.
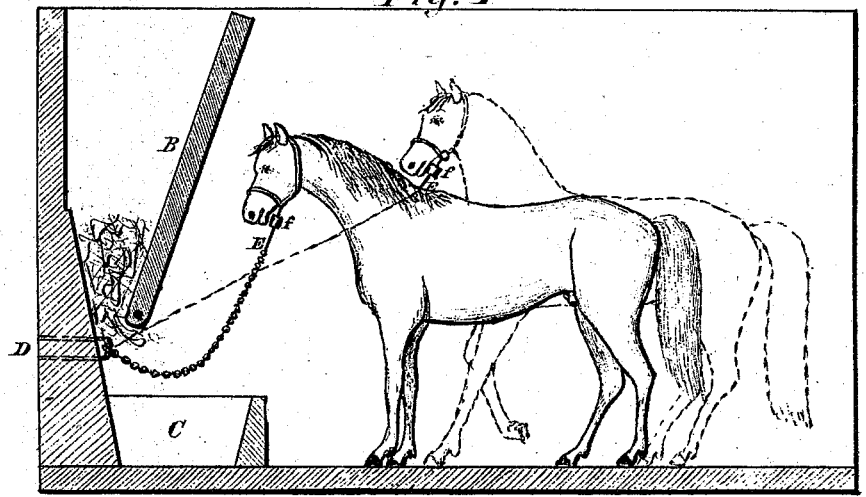
Fig. I
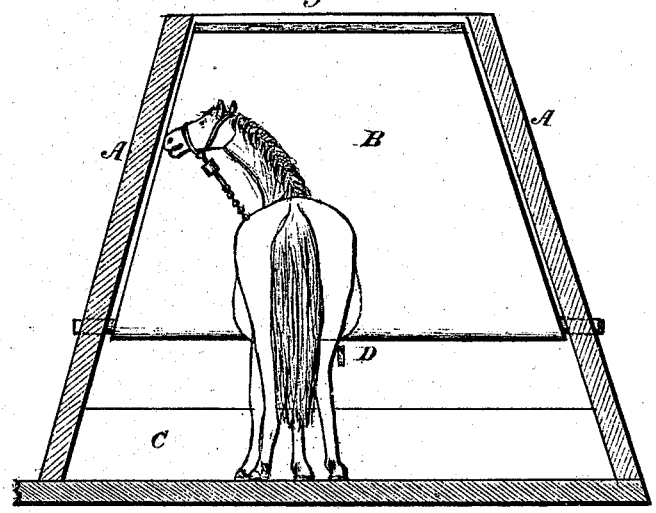
Fig. II
G. M. Allison
B. H. Muehle
John Kraus
INVENTOR

United States Patent Office.

JOHN KRAUS, OF CLARENCE, NEW YORK, ASSIGNOR TO HIMSELF AND HENRY LAPP, OF SAME PLACE.

Letters Patent No. 105,814, dated July 26, 1870.

IMPROVEMENT IN STALLS FOR PREVENTING CRIBBING.

The Schedule referred to in these Letters Patent and making part of the same

*To all whom it may concern:*

Be it known that I, JOHN KRAUS, of Clarence, in the county of Erie and State of New York, (assignor to myself and HENRY LAPP,) have invented a certain new and improved Device for Preventing Horses from Cribbing; and I do hereby declare that the following is a full, clear, and exact description thereof, reference being had to the accompanying drawing making a part of this specification, in which—

Figure I is a longitudinal vertical section; and

Figure II, a transverse vertical section of a stall for cribbing horses, showing the position of a horse therein.

Figure III is a perspective view of a horse's head, provided with an improved bridle-bit.

This invention relates to the construction of a stall for cribbing horses, with inclined side walls and head-board, the manger being placed upon the floor of the stall, and the hitching-staple underneath the head-board, and out of reach of the horse.

Letters of like name and kind refer to like parts in each of the figures.

A A represent the side walls of a stall for cribbing horses. They are erected in an inclined position, leaning inwardly toward the horse.

B represents a head-board, which is hinged at its bottom, and may be adjusted at any desired inclination.

The space between this head-board and the end wall may be used for a hay-crib, the horse feeding from the bottom, which is located at a height level with or below the knees of the animal.

The manger, C, is placed still lower, or on the floor of the stall. The horse is hitched to a staple, D, driven into the end wall immediately below the lower end of the head-board B, and entirely out of reach of the animal.

It is probably not generally known, but has been established by prominent horsemen as a fact, that horses will not, or cannot, crib below their knees, and hence in devising a stall for cribbing horses, I place the manger and hay-feed as near the floor of the stall as may be convenient. Thus it is made impossible for the horse to indulge in cribbing while it feeds, the slanting walls and inclined head-board present no advantages for such indulgence, and the location of the hitching-staple (another favored place for cribbing) is such that it cannot be conveniently approached.

Thus my arrangements for preventing horses from cribbing in the stall are complete, and horses thus afflicted may, by the use of my invention, be entirely cured in a short time, as I have proved by actual experiment.

The side walls and head-board may be covered with tin or sheet-iron, for the purpose of making their surfaces smooth, hard, and slippery.

What I claim as my invention, and desire to secure by Letters Patent, is—

A stall for cribbing horses, the side walls, A, and head-board, B, of which are inclined inwardly, substantially as and for the purpose described.

JOHN KRAUS.

Witnesses:
   G. M. ALLISON,
   B. H. MUEHLE.